(12) United States Patent
Fukuhara (10) Patent No.: US 8,760,635 B2
(45) Date of Patent: Jun. 24, 2014

(54) DISPLACEMENT MEASURING APPARATUS AND VELOCITY MEASURING APPARATUS WHICH MEASURE DISPLACEMENT AMOUNT OF MOVING OBJECT

(75) Inventor: Takashi Fukuhara, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/008,402

(22) Filed: Jan. 18, 2011

(65) Prior Publication Data
US 2011/0181865 A1 Jul. 28, 2011

(30) Foreign Application Priority Data
Jan. 22, 2010 (JP) ................................. 2010-012471

(51) Int. Cl.
*G01P 3/36* (2006.01)

(52) U.S. Cl.
USPC .......................................... 356/28; 356/28.5

(58) Field of Classification Search
USPC .................... 356/28, 622, 600–608
See application file for complete search history.

(56) References Cited

U.S. PATENT DOCUMENTS

| | | | | |
|---|---|---|---|---|
| 3,778,158 A | * | 12/1973 | Erickson ........................ | 356/28 |
| 3,838,924 A | * | 10/1974 | Flower et al. .................. | 356/28 |
| 4,921,345 A | * | 5/1990 | Tsuchitani et al. ............. | 356/28 |
| 5,283,434 A | * | 2/1994 | Ishizuka et al. ........... | 250/237 G |
| 5,644,141 A | * | 7/1997 | Hooker et al. .......... | 250/559.22 |
| 5,886,787 A | | 3/1999 | Hercher | |
| 6,675,121 B1 | * | 1/2004 | Hardin et al. ................. | 702/142 |
| 7,022,974 B2 | | 4/2006 | Igaki et al. | |
| 7,501,616 B2 | * | 3/2009 | Wiklof .......................... | 250/234 |
| 2006/0290921 A1 | * | 12/2006 | Hotelling et al. ........... | 356/152.2 |
| 2007/0102523 A1 | * | 5/2007 | Kong ........................ | 235/462.16 |
| 2007/0229798 A1 | * | 10/2007 | Cattin et al. .................... | 356/28 |
| 2009/0221387 A1 | * | 9/2009 | Ohama et al. ................. | 473/383 |

FOREIGN PATENT DOCUMENTS

| | | | |
|---|---|---|---|
| CN | 1205428 A | | 1/1999 |
| JP | 58-113762 | * | 6/1983 |
| JP | 58-113762 A | | 7/1983 |
| JP | 2003-337052 | * | 11/2003 |
| JP | 2003-337052 A | | 11/2003 |
| JP | 2006-250877 A | | 9/2006 |

OTHER PUBLICATIONS

Translation for JP2003-337052.*
Office Action issued in counterpart appln. No. RU2011102350, dated Jan. 16, 2012. English translation provided.

(Continued)

*Primary Examiner* — Luke Ratcliffe
(74) *Attorney, Agent, or Firm* — Rossi, Kimms & McDowell, LLP (57) ABSTRACT

A displacement measuring apparatus 100 which measures a displacement amount of a moving object 102 includes a light source that irradiates the moving object 102 using luminous flux emitted from a light emitting area 101, a photo diode array 104, 105 that includes a plurality of light receiving areas in a movement direction of the moving object 102 and that forms an image of the luminous flux reflected on a plurality of indentations 103 of the moving object 102 to receive light, and a measurement unit that measures the displacement amount of the moving object 102 based on a movement amount of a light emitting area image 106 that is formed on the photo diode array 104, 105 by forming the image of the luminous flux.

17 Claims, 8 Drawing Sheets

(56) References Cited

OTHER PUBLICATIONS

Japanese Office Action cited in Japanese counterpart application No. JP2010-012471, dated Sep. 3, 2013.

Notification of the Second Office Action for corresponding CN 201110020010.8, dated Sep. 17, 2013. English translation provided.

* cited by examiner

DISPLACEMENT MEASURING APPARATUS AND VELOCITY MEASURING APPARATUS WHICH MEASURE DISPLACEMENT AMOUNT OF MOVING OBJECT

BACKGROUND OF THE INVENTION

1. Field of the Invention

The present invention relates to a displacement measuring apparatus and a velocity measuring apparatus which perform noncontact measurements of a displacement amount and a velocity, respectively.

2. Description of the Related Art

As a method of performing noncontact detection of a displacement amount of a moving object, the following two methods are known. One is a method of irradiating coherent light onto the moving object to generate a speckle pattern caused by a complex interference of luminous flux that is obtained by the reflection and the divergence of the light to detect a displacement or a velocity of the moving object based on a movement of the speckle pattern in accordance with a movement of the moving object. The other is a method of irradiating coherent light beams at incident angles different from each other with respect to the moving object to obtain a velocity of the moving object based on a difference between optical frequency Doppler shifts that are received at the time of the reflection and the divergence. However, in the methods described above, there is a problem of low reliability of an LD (laser diode) or a VCSEL (vertical cavity surface emitting laser) used as a coherent light source, high cost caused by the complexity of the configuration of an apparatus, or the like. Therefore, Japanese Patent Laid-Open No. 58-113762 discloses a method of using an incoherent light source to detect a displacement amount and a velocity of an imaged object.

However, in the velocity measuring apparatus disclosed in Japanese Patent Laid-Open No. 58-113762, an optical pattern image on a light receiving portion is not clear because reflected light from a surface of the moving object does not pass through an imaging system. Therefore, amplitude of a signal detected by a photo diode array of the light receiving portion is low, and an SN (signal to noise) ratio as signal integrity is deteriorated. As a result, detection accuracy of the displacement amount of the optical pattern image is reduced and measurement accuracy of the velocity is also reduced. On the other hand, if an imaging system such as a lens is added to the measurement apparatus in order to make the optical pattern image clear, the cost increases or reducing the size of the apparatus is prevented because of the increase of the number of the parts.

SUMMARY OF THE INVENTION

It is desirable to provide highly accurate displacement measuring apparatus and velocity measuring apparatus.

A displacement measuring apparatus as one aspect of the present invention measures a displacement amount of a moving object. The displacement measuring apparatus includes a light source configured to irradiate the moving object using luminous flux emitted from a light emitting area; a light receiving element including a plurality of light receiving areas arranged in a movement direction of the moving object, the light receiving element being arranged such that luminous flux emitted from the light emitting area and that is reflected from indentations in the moving object are imaged on a light receiving surface of the light receiving element; and a measurement unit configured to measure the displacement amount of the moving object based on a movement amount of a light emitting area image that is formed on the light receiving element.

A velocity measuring apparatus as another aspect of the present invention includes the displacement measuring apparatus, and is arranged to detect a velocity of the moving object based on the displacement amount of the moving object determined by the displacement measuring apparatus in a predetermined time.

Further features and aspects of the present invention will become apparent from the following description of embodiments with reference to the attached drawings.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

Embodiment 1

Figure 1:
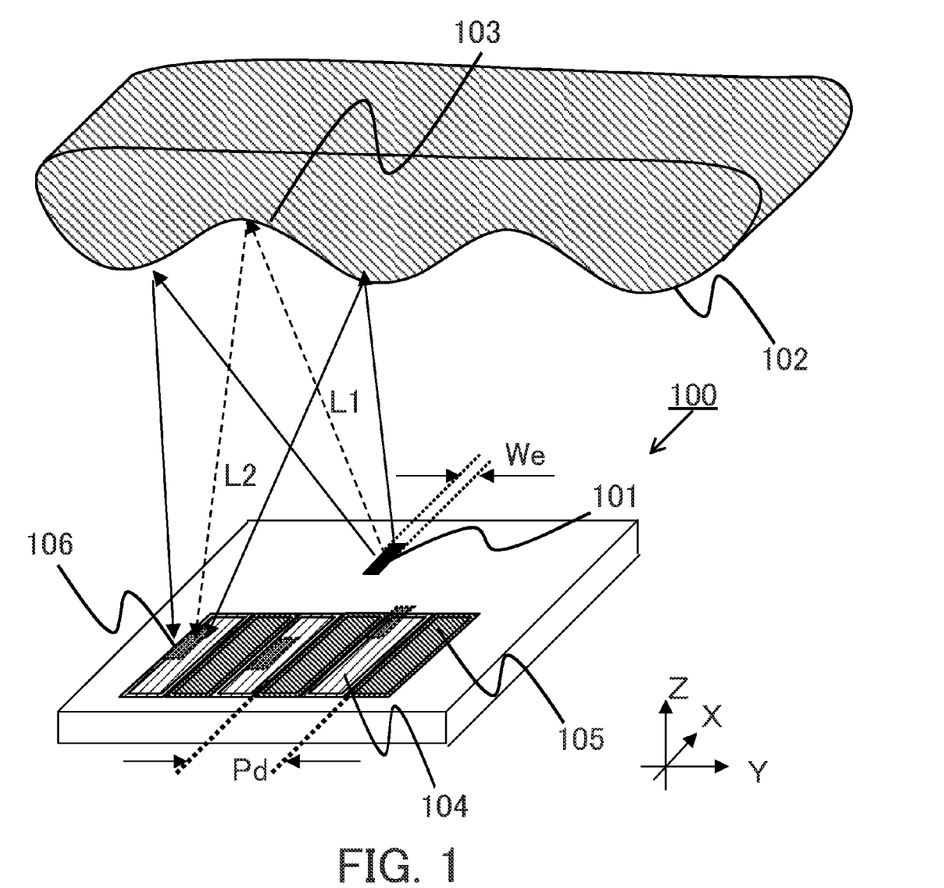
FIG. 1 is a schematic configuration diagram of a displacement measuring apparatus in Embodiment 1.

First of all, a displacement measuring apparatus in Embodiment 1 of the present invention will be described. FIG. 1 is a schematic configuration diagram of the displacement measuring apparatus in the present embodiment. In FIG. 1, reference numeral 100 denotes a displacement measuring apparatus which measures a displacement amount of a moving object. Reference numeral 101 denotes a light emitting area 101 of a light source that is provided in the displacement measuring apparatus 100. The moving object is irradiated by using luminous flux emitted from the light emitting area 101. The light emitting area 101 indicates a light emitting pattern formed by a mask such as an opening that is formed in a laminated electrode on a light emitting surface of a bare chip LED (light emitting diode). The light emitting area 101 also includes a light emitting surface of a surface light emitting light source such as a VCSEL or a light emitting surface of an LD of around 1 μm to 2 μm.

Reference numeral 102 denotes a moving object. The moving object 102 is a measurement target of a displacement amount performed by the displacement measuring apparatus 100. The moving object 102 is capable of moving in a Y direction, and is irradiated by divergent light from the light emitting area 101 of the light source. The divergent light irradiated on the moving object 102 is reflected and converged on indentations 103 of the moving object 102 to form a light source area image 106 on photo diode arrays 104 and 105 (a light receiving element). As illustrated in FIG. 1, the light receiving element includes a plurality of light receiving areas (e.g. a plurality of photo diode arrays 104 and 105) arranged in a movement direction (the Y direction) of the moving object 102, and forms an image of luminous flux reflected from the concave indentations 103 of the moving object 102 to receive the luminous flux. The displacement measuring apparatus 100 includes a measurement unit (not shown) that measures the displacement amount of the moving object 102 based on a movement amount of the light emitting area image 106 formed on the light receiving element by imaging the luminous flux reflected from the indentations 103.

It is preferable that the indentations 103 are concave and have a focal length F that meets the following Expression (1), where L1 is an optical path length from a light emitting point on the light emitting area 101 of the light source to the indentation 103 and L2 is an optical path length from the indentation 103 to the photo diode arrays 104 and 105.

$$-1/L1-1/L2=1/F \quad (1)$$

The photo diode arrays 104 and 105 are alternately arranged with a width Pd/2 and a pitch Pd (a period width) in the movement direction (the Y direction) of the moving object 102. The photo diode arrays 104 and 105 have the same configuration and are spatially displaced each other by the width Pd/2 in the movement direction of the moving object 102. A width We of the light emitting area 101 is determined by linking the width of each of the photo diode arrays 104 and 105. The details will be described below.

Figure 2A:
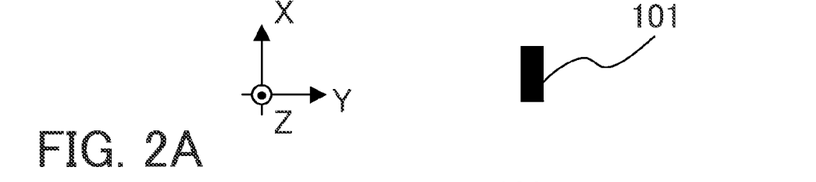
FIGS. 2A to 2D are explanatory diagrams of a principle of generating a light emitting area image in a displacement measuring apparatus in Embodiment 1.
Figure 2B:
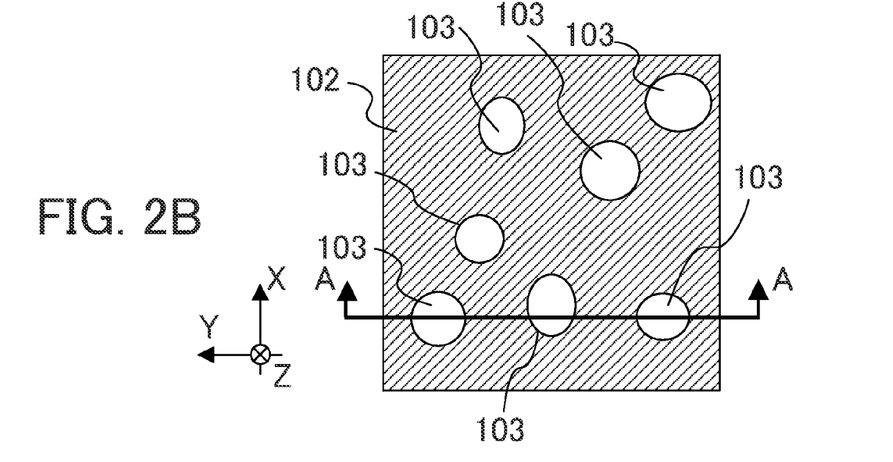
Figure 2C:
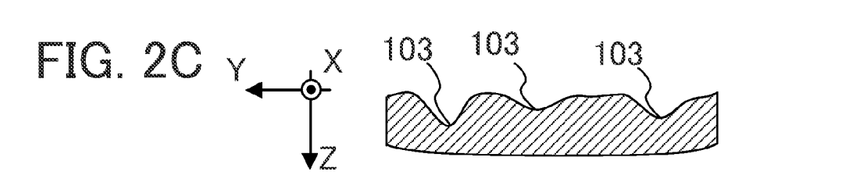
Figure 2D:
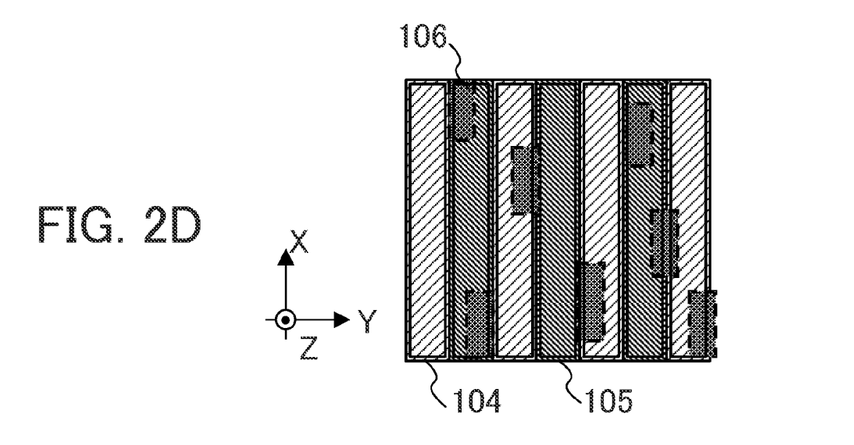

Next, referring to FIGS. 2A to 2D, a principle of generating the light emitting area image 106 in the displacement measuring apparatus 100 will be described. First of all, a position where the light emitting area image 106 is generated will be described. Divergent light that is emitted from the light source including the light emitting area 101 illustrated in FIG. 2A is reflected and converged on each of the indentations 103 on the surface of the moving object 102 illustrated in FIG. 2B. Therefore, as illustrated in FIG. 2D, the light emitting area image 106 of the light source is formed on the surfaces of the photo diode arrays 104 and 105 with a position relation corresponding to a position of each of the indentations 103 on a surface of the moving object 102.

Next, a shape of the indentation 103 of the moving object 102 and a phenomenon of the formation of the light emitting area image 106 will be described. On a surface of a common object, as illustrated in FIG. 2B, the indentations 103 having a variety of shapes are distributed. A width of each of the indentations 103 is different from each other as illustrated in FIG. 2C that is A-A cross section of FIG. 2B. Thus, the indentations 103 having a variety of shapes exist. However, when the light receiving portion surface (the photo diode arrays 104 and 105) is arranged at an optimal observation position that is determined by a shape of the indentation 103 of the moving object 102, the light emitting area image 106 is formed in some cases. This is a case in which the indentation 103 has a focal length F that meets Expression (1) above.

For example, in an area where a distance between the displacement measuring apparatus 100 (the light receiving portion surface) and the moving object 102 is around 1 to 3 mm, a shape of the indentation 103 which has a diameter of around 100 μm and a depth that is equal to or smaller than around 2 μm contributes to the formation of the light emitting area image 106. Additionally, in an area where a distance between the light receiving portion surface and the moving object 102 is around 4 to 6 mm, a shape of the indentation 103 which has a diameter of around 200 μm and a depth of around a few μm contributes to the formation of the light emitting area image 106. Thus, the area in the indentation 103 which contributes to the formation of the image is different in accordance with the observation position. Therefore, when the indentation 103 has a curved complex shape as described above, the light emitting area image 106 is formed even if the distance between the light receiving portion surface and the moving object 102 is changed to some extent.

Next, the size of the light emitting area image 106 that is to be formed will be described. As described above, when the indentation 103 has the focal length F which meets Expression (1), the light emitting area image 106 is formed on the photo diode arrays 104 and 105. However, the indentation 103 does not have an ideal curved surface, and has a plurality of curved complex shapes in many cases. In this case, the light emitting area image 106 is formed by overlapping a light emitting area image that is formed on the indentation 103 having the focal length F which meets Expression (1) with a plurality of light emitting area images that are defocused by the plurality of curved complex shapes. Due to such a phenomenon, the light emitting area image 106 that is formed on the photo diode arrays 104 and 105 has a width of around one and a half times to twice as wide as the width of the light emitting area 101 where an image is ideally formed.

Fundamentally, if the width of the light emitting area image 106 is equal to the width of each of the photo diode arrays 104 and 105, detection with high light use efficiency can be performed. However, due to the above phenomenon, the formed light emitting area image 106 crosses the width Pd/2 of each of the photo diode arrays 104 and 105, and the light emitting area image 106 spreads out or overlaps to adjacent photo diode arrays 104 and 105. Therefore, according to a principle of a signal detection described below, detected signal amplitude is decreased, and velocity detection accuracy is deteriorated. In the embodiment, reference symbol We is defined as a width of the light emitting area 101 of the light source in the movement direction (the Y direction) of the moving object 102. When We/Pd—that is, a ratio of the light emitting area width We of the light source and a photo diode array pitch Pd—is equal to or greater than 0.87 due to the above phenomenon, the size of the image on the light receiving surface in the movement direction is equal to or greater than a width of the photo diode array pitch. As a result, since the detection signal amplitude with respect to a displacement of the moving object is lowered by ten percent or more, there is a problem that the determination accuracy of the displacement is deteriorated. Accordingly, it is preferable that We/Pd is equal to or less than 0.87.

Conversely, if the light emitting area 101 of the light source is too small, the light emitting area image does not overlap into the adjacent photo diode array. However, when the value of We/Pd is smaller than 0.275, a problem may be caused in which the detected signal amplitude is decreased by ten percent or more to deteriorate determination accuracy of the displacement amount of the moving object because of the decrease of a detected light intensity caused by the shrinkage of the light emitting area. Accordingly, in order to obtain the displacement detection accuracy, it is preferable that a condition that is represented by the following Expression (2) is met.

$$0.275 \leq We/Pd \leq 0.87 \quad (2)$$

Figure 3A:
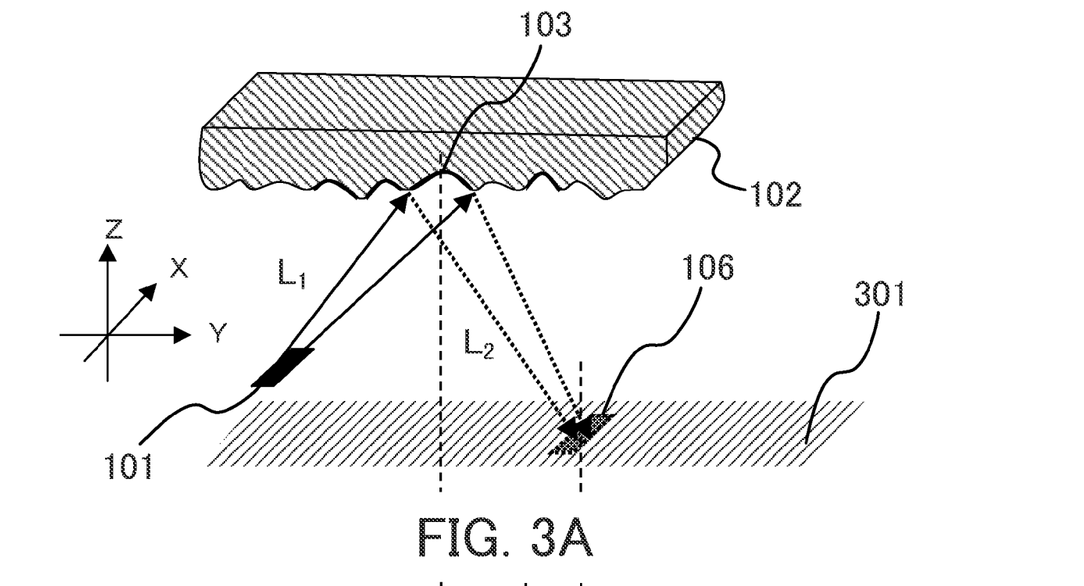
FIGS. 3A and 3B are diagrams illustrating a relationship between a movement amount of a moving object and a movement amount of a light emitting area image in Embodiment 1.
Figure 3B:
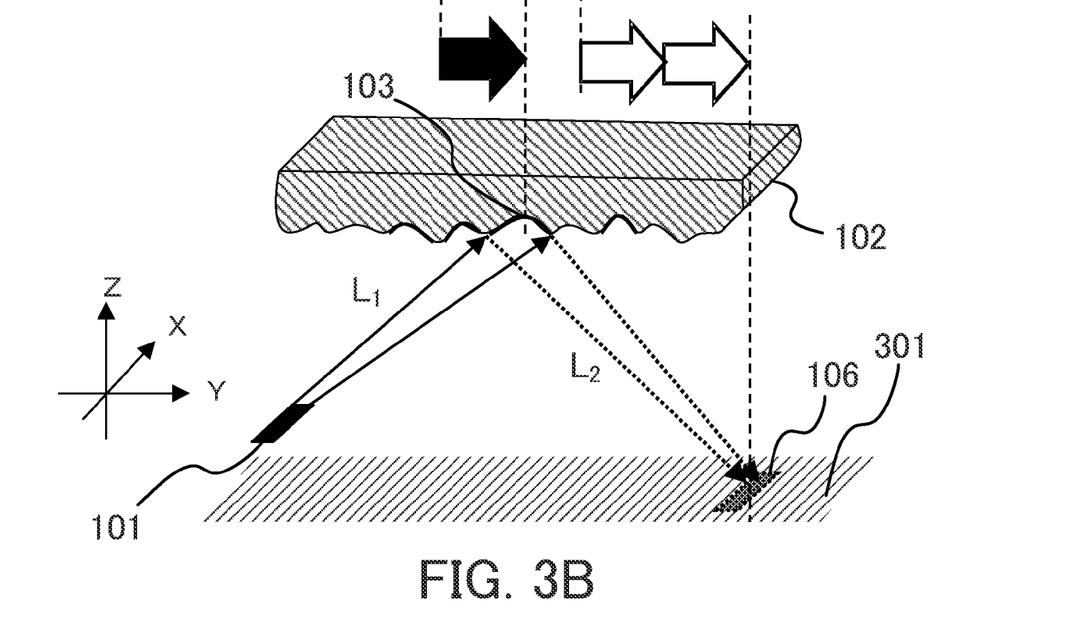

Next, referring to FIGS. 3A and 3B, a displacement principle of the light emitting area image 106 will be described. FIGS. 3A and 3B indicate a relationship between a movement amount of the moving object 102 and a moving amount of the light emitting area image 106 on the photo diode array surface 301. FIG. 3A is a position relation between the moving object 102 and the light emitting area image 106 at a time T1, and FIG. 3B is a position relation between the moving object 102 and the light emitting area image 106 at a time T2. A black arrow in FIG. 3B indicates a moving amount of the moving object 102 in a time difference T2−T1, and white arrows in FIG. 3B indicate a moving amount of the light emitting area image 106 on the photo diode array surface 301 in the time difference T2−T1.

The relationship between the movement amount (i.e. displacement) of the moving object 102 and the movement amount (i.e. displacement) of the light emitting area image 106 is represented as follows.
MOVING OBJECT:LIGHT EMITTING AREA IMAGE=1: (L1+L2)/L1

In the present embodiment, the optical path length L1 from a light emitting point on the light emitting area 101 of the light source to a surface (the indentation 103) of the moving object 102 and the optical path length L2 from the surface of the moving object 102 to the photo diode array 104 that is a light receiving element are equal to each other. Therefore, the relationship between the movement amount of the moving object 102 and the movement amount of the light emitting area image 106 is as follows.
MOVING OBJECT:LIGHT EMITTING AREA IMAGE=1:2

Based on the above principle, the light emitting area image 106 formed on the photo diode array surface 301 moves in accordance with the movement of the moving object 102.

Next, referring back to FIG. 1, a method of detecting the displacement amount of the moving object 102 will be described in detail. First of all, a configuration of the photo diode array and a signal detecting method will be described. The light emitting area image 106 is formed on the photo diode arrays 104 and 105 by the indentations 103 of the moving object 102. A two-dimensional optical pattern image comprising the light emitting area image 106 generated on the photo diode arrays 104 and 105 is photoelectrically converted by the photo diode arrays 104 and 105 to be converted into a voltage value indicating a one-dimensional light intensity. Then, a sum of the detected voltage values of a plurality of photo diodes that constitute the photo diode array 104 is obtained, and a detected voltage value V1 of the photo diode array 104 is determined in combination with a spatial filter function. Similarly, a sum of the detected voltage values of a plurality of photo diodes that constitute the photo diode array 105 is obtained, and a detected voltage value V2 of the photo diode array 105 is determined in combination with the spatial filter function. Then, the displacement measuring apparatus 100 outputs a difference V1-V2 of the detected voltage values of both the photo diode arrays 104 and 105, i.e. a differential of the outputs of the photo diode arrays 104 and 105, as a voltage value at a predetermined time.

Next, a method of detecting the displacement amount of the moving object 102 based on movements of the optical pattern images on the photo diode arrays 104 and 105 caused by the movement of the moving object 102 will be described.

In the embodiment, a case in which the detected voltage values V1 and V2 of the displacement measuring apparatus 100 are equal to Va and Vb, respectively, and the difference V1−V2 of the detected voltage values is equal to Va−Vb that is a positive voltage (V1−V2=Va−Vb>0) is considered. In this case, when the optical pattern image is moved by Pd/2, a phase of the intensity distribution is reversed by 180 degrees and the sign of the detected voltage value is reversed to be negative. In other words, the difference V1−V2 of the detected voltage value is nearly equal to Vb−Va (V1−V2≒Vb−Va<0).

When the optical pattern image is further moved by Pd/2, i.e. one period of pitches of the photo diode arrays 104 and 105, the sign of the detected voltage value is reversed to be a positive. In other words, V1−V2≒Vb−Va>0 is met. Thus, when the optical pattern image is moved by the pitch Pd (the displacement amount) on the photo diode arrays 104 and 105, a one-period waveform is detected. In other words, in accordance with the movement of the moving object 102, the number of the periods of output voltage changes that are detected by the displacement measuring apparatus 100 is counted to be able to detect a movement amount of the optical pattern image on the photo diode arrays 104 and 105. Thus, based on the relationship between the moving object 102 and the light emitting area image 106 described above and the movement amount of the detected optical pattern image, as described referring to FIGS. 3A and 3B, the displacement amount of the moving object 102 can be detected.

In the present embodiment, a configuration of a differential detection photo diode array is adopted in order to increase the amplitude of the detected signal, but the configuration of the displacement measuring photo diode array is not limited to this. For example, using a photo diode array, the displacement amount may also be detected based on a situation where a one-dimensional intensity distribution of the optical pattern image is displaced on the array. In the embodiment, the differential amplification does not have to be performed using the differential photo diode array 105.

The indentations 103 are discretely or continuously provided on the moving object 102, and is preferably a shape including a radius of curvature that meets the following Expression (3), where R is a radius of curvature of the indentation 103.

$$R=(L1+L2)/2 \quad (3)$$

Figure 4:
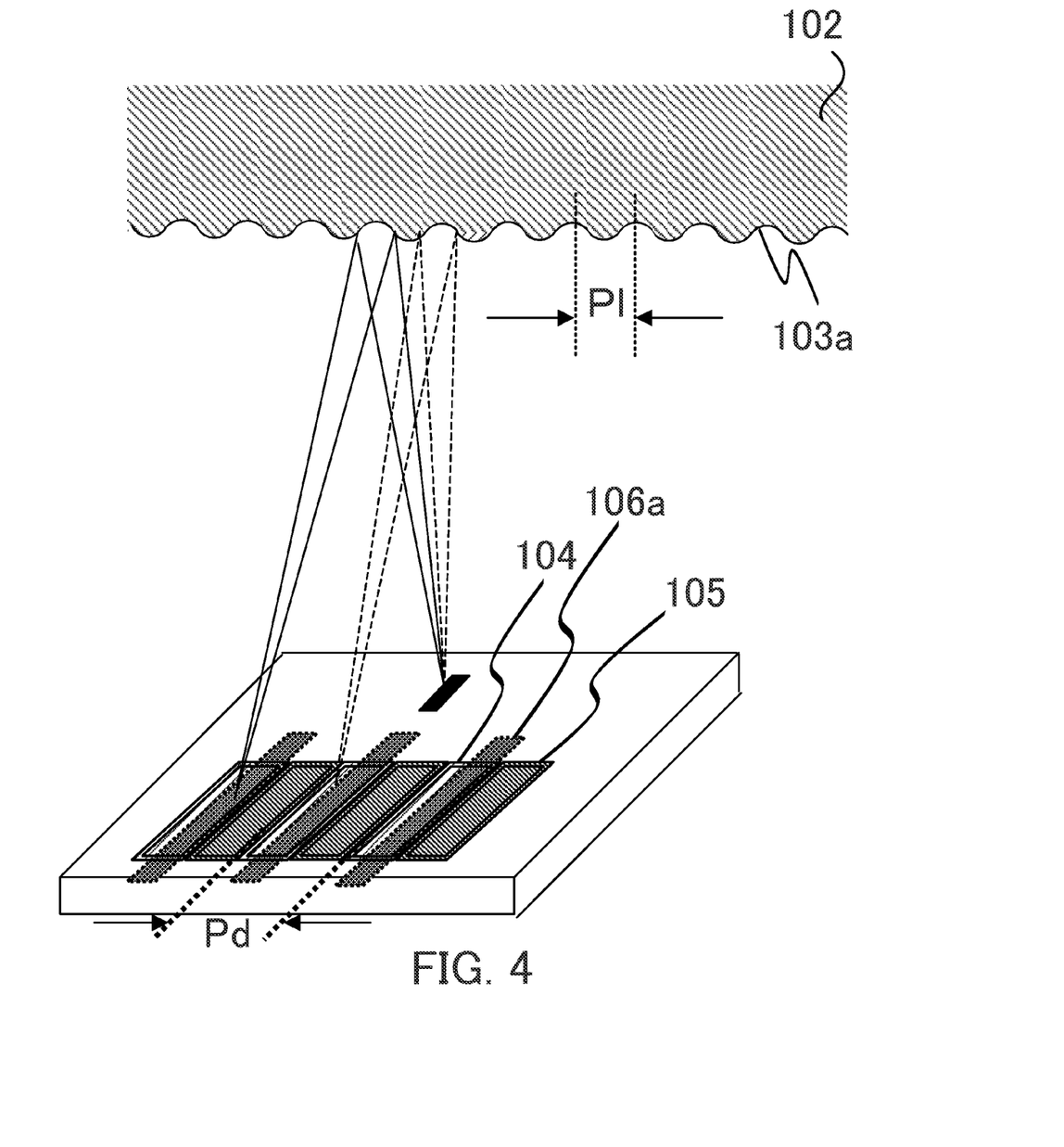
FIG. 4 is a diagram illustrating indentations that are periodically arranged on a surface of a moving object in Embodiment 1.

The indentation 103 included in the moving object 102 is not only limited to a hemispherical shape, but also a (semi-) cylindrical surface may be adopted. Furthermore, as illustrated in FIG. 4, the concave shape 103a may be periodically formed on the moving object 102 on purpose. In this case, an array period P1 meets the following Expression (4), where k is a positive integer.

$$P1=Pd/2 \times k \quad (4)$$

Thus, the displacement amount of the moving object 102 may also be detected using the periodical light emitting area image 106a that is formed on the photo diode arrays 104 and 105.

Embodiment 2

Figure 5:
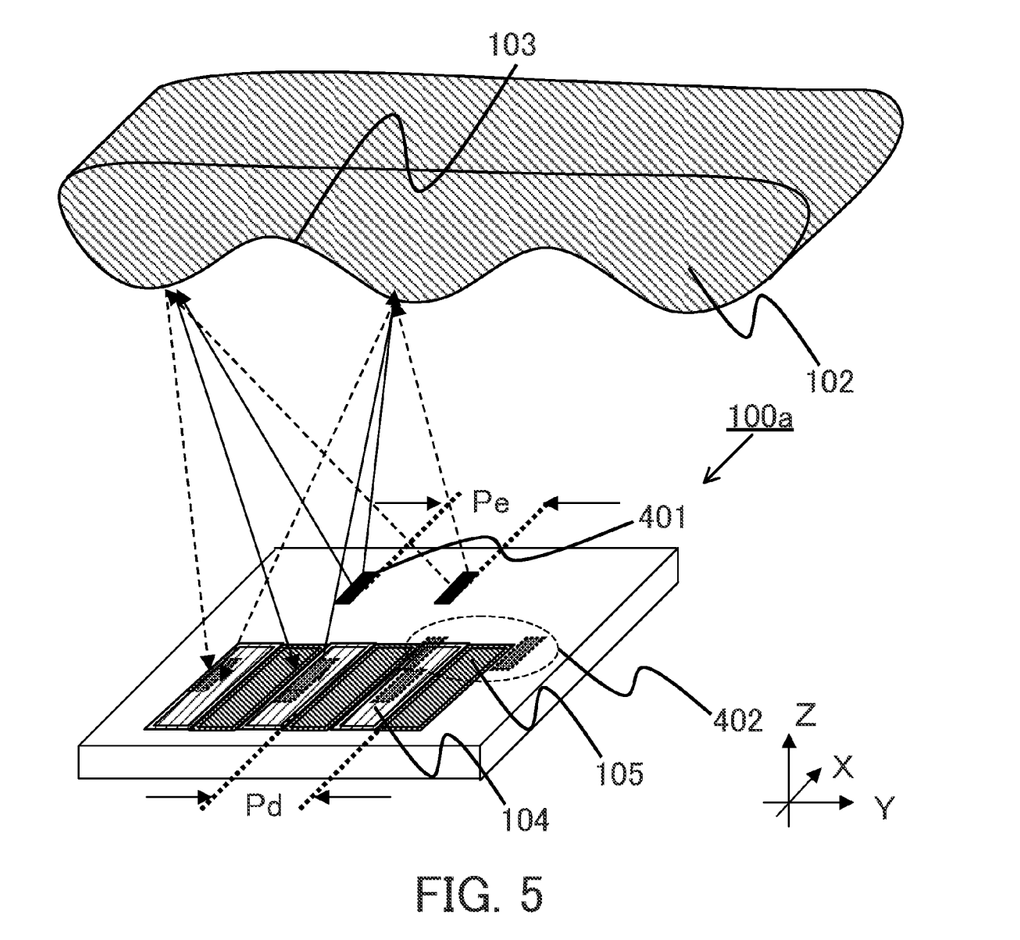
FIG. 5 is a schematic configuration diagram of a displacement measuring apparatus in Embodiment 2.

Next, Embodiment 2 of the present invention will be described. FIG. 5 is a schematic configuration diagram of a displacement measuring apparatus 100a in the present embodiment. The displacement measuring apparatus 100a of the present embodiment is different from the displacement measuring apparatus 100 of Embodiment 1 in that a plurality of light emitting areas 401 (even numbers of light emitting areas) are arranged in the light source at a pitch Pe. In the present embodiment, a change of a light emitting area image 402 and an influence on a detected signal caused by providing the plurality of light emitting areas 401 will be described.

For example, when the optical path length L1 is equal to the optical path length L2 (L1=L2), a light emitting area image that is formed by one indentation 103 is formed at the same magnification as the original light emitting area 401, and a plurality of light emitting area images 402 also having the pitch Pe are formed. Thus, a plurality of light sources may be provided to be able to generate images with predetermined pitches in a random optical pattern image. The pitch Pe of the formed light emitting area images 402 is aligned with the pitch Pd of the photo diode arrays 104 and 105 to be able to effectively obtain an effect as a spatial filter of the photo diode arrays 104 and 105 arranged spatially with the pitch. In other words, even if the indentations 103 have a random period, the light emitting area images 402 have the periodicity of the light emitting areas and have the same period as a photo diode array period of image detection, resulting in an increase of the detected signal amplitude and an improvement of the displacement detection.

In accordance with a mounting accuracy of the light source or the photo diode array in a Z-axis direction, the imaging magnification of the plurality of light emitting area images 402 may be changed to displace the pitch of the light emitting area images of the plurality of light emitting area images 402 from the predetermined pitch Pe. In this case, the signal amplitude is decayed and an error of the velocity detection accuracy is increased. If the displacement amount is large, the detected voltage values of the photo diode arrays 104 and 105 may be equal to each other and the signal cannot be obtained by the differential of the detected voltage value of each photo diode array in some cases. Therefore, in order to obtain an effective displacement detection signal, it is preferable that the pitch Pe of the light emitting area images 402 and the pitch Pd of the photo diode arrays 104 and 105 meet the following Expression (5).

$$\left(1 - \frac{1}{2(N-1)}\right) \times \frac{L1}{L2} < \frac{Pe}{Pd} < \left(1 + \frac{1}{2(N-1)}\right) \times \frac{L1}{L2} \quad (5)$$

In the expression, N is an integer equal to or greater than 2 and indicates the number of the light emitting areas. The present embodiment describes an embodiment with two light emitting areas, but is not limited to this as long as Expression (5) described above is met. Additionally, in order to obtain a spatial filter function, the light emitting areas have only to be arranged so as to include a period of integral multiple of the pitch Pe of the light emitting area images 402 which meets Expression (5). Since a principle of detecting the displacement amount is similar to that of Embodiment 1, the description in the embodiment is omitted.

In the present embodiment, the configuration of the differential detection photo diode array is adopted in order to increase the amplitude of the detected signal, and similarly to Embodiment 1, the configuration of the displacement measuring photo diode is not limited to this. For example, using the photo diode array, the displacement amount may also be detected based on a situation where the one-dimensional intensity distribution of the optical pattern image is being displaced on the array. In the embodiment, the differential amplification does not have to be performed using the differential photo diode array 105. The indentation 103 of the moving object 102 is not only limited to a hemispherical shape, but also a shape may be adopted in which an indentation that is a (semi-) cylindrical surface and is periodically formed on purpose as illustrated in FIG. 4.

Embodiment 3

Figure 6:
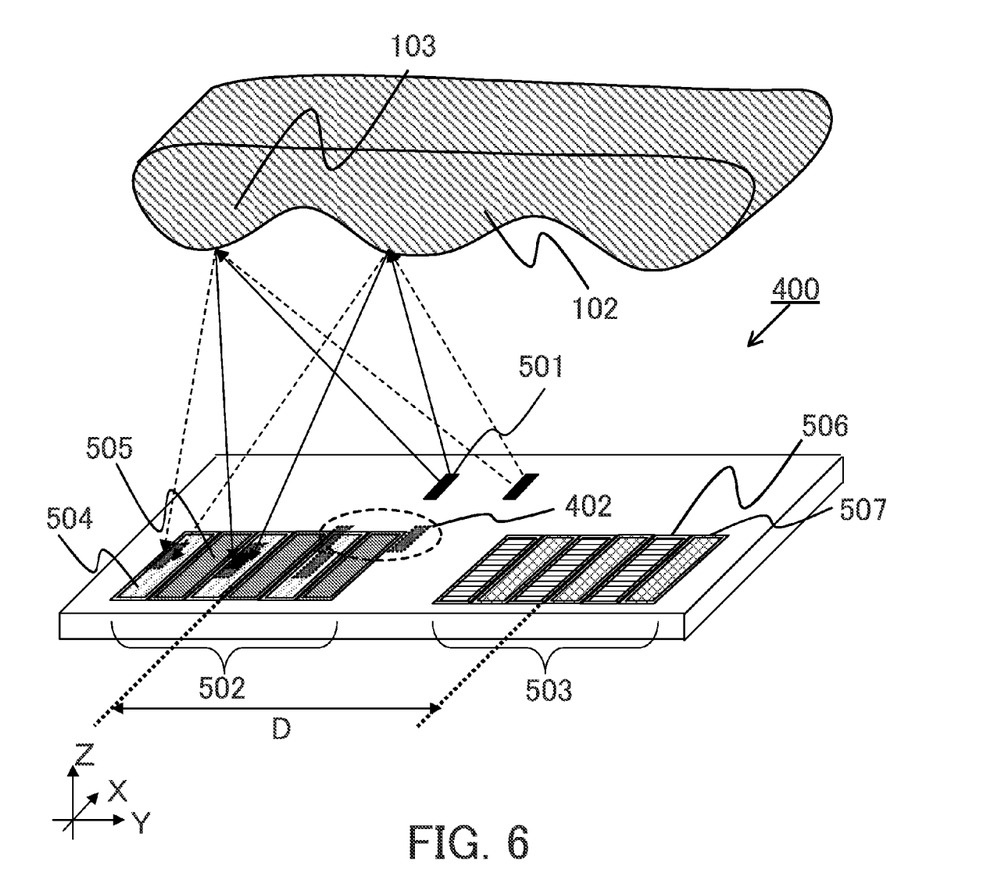
FIG. 6 is a schematic configuration diagram of a velocity measuring apparatus in Embodiment 3.

Next, Embodiment 3 of the present invention will be described. In the present embodiment, a method of measuring a velocity of the moving object 102 using the displacement measuring apparatus 100 of Embodiment 1 or the displacement measuring apparatus 100a of Embodiment 2 will be described. FIG. 6 is a schematic configuration diagram of a velocity measuring apparatus 400 in the present embodiment. The velocity measuring apparatus 400 is configured so as to detect the velocity of the moving object 102 based on a displacement amount of the moving object 102 in a predetermined time or a time needed for the moving object to pass a predetermined distance.

The velocity measuring apparatus 400 includes a plurality of light emitting areas 501 and photo diode array groups 502 and 503. The photo diode array group 502 includes a photo diode array 504 and a photo diode array 505 that are used for performing differential detection. The photo diode array group 503 includes a photo diode array 506 and a photo diode array 507 that are also used for performing differential detection. The photo diode array groups 502 and 503 are disposed with their centers separated by a distance D. A two-dimensional optical pattern image constituted of a plurality of light emitting area images 402 that is generated on each photo diode array group is photoelectrically converted by the photo diode array, and a one-dimensional light intensity is converted into a voltage value. Then, as a sum of the detected voltage values of a plurality of photo diodes constituting the photo diode array 504, a detected voltage value V1 of the photo diode array 504 is determined. Similarly, as a sum of the detected voltage values of a plurality of photo diodes constituting the photo diode array 505, a detected voltage value V2 of the photo diode array 505 is determined. Then, the photo diode array group 502 outputs a difference V1−V2 of the detected voltage values as a voltage value at a predetermined time. Similarly, the photo diode array group 503 outputs a voltage value at a predetermined time.

Next, a method of detecting the velocity will be described. In the embodiment, a case in which the moving object 102 moves in a Y-axis direction is considered. In this case, first, a displacement signal in accordance with the movement of the optical pattern image is detected by the photo diode array group 502. Subsequently, the displacement signal in accordance with the movement of the optical pattern image at the same position is delayed by a time that depends upon the distance D between the photo diode array groups 502 and 503 in the Y-axis direction and the velocity of the moving object 102 to be detected by the photo diode array group 503. If a detection time difference T of the same signal detected by each photo diode array group is precisely obtained, the velocity of the moving object 102 can be calculated as D is known (and velocity is of course distance over time; D/T).

Figure 7:
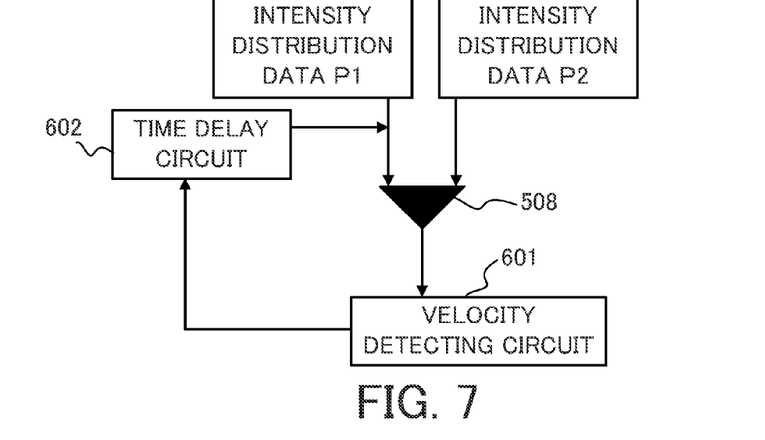
FIG. 7 is a block diagram of a process that provides data with a time delay in Embodiment 3.

Next, referring to FIG. 7, the method of detecting the velocity will be specifically described. FIG. 7 is a block diagram of a process that provides data with a time delay. Variation data (intensity distribution data) of the detected output in accordance with the movement of the moving object 102 in a predetermined time, which is previously detected by the photo diode array group 502, is defined as P1. Similarly, variation data (intensity distribution data) of the detected output, which is detected by the photo diode array group 503 with delays in accordance with the movement of the moving object 102 in the predetermined time, is defined as P2. The variation data P1 and P2 are compared by a comparator 508, which compares voltage values with respect to a time.

If an optimum time delay amount of data is provided to the variation data P1, as a result of the comparison by the comparator 508, the variation data P1 and P2 of respective photo diode array groups coincide with each other with respect to a time. On the other hand, if the variation data P1 and P2 do not coincide with each other, a velocity detecting circuit 601 provides a time delay circuit 602 with a correction value with respect to the time delay amount. Then, the comparator 508 performs the comparison again using the variation data P1 to which a corrected time delay amount is provided. In accordance with the loop, the velocity detecting circuit 601 determines the detection time difference T. Furthermore, based on the distance D between the photo diode array groups 502 and 503, a velocity V of the moving object 102 can be obtained by using the following Expression (6).

$$V = \frac{D}{T} \cdot \frac{L1}{L1+L2} \quad (6)$$

The present embodiment describes an example where the velocity measuring apparatus 400 is configured by using the displacement measuring apparatus 100a in Embodiment 2. However, the present embodiment is not limited to this, and the velocity measuring apparatus 400 may also be configured by using the displacement measuring apparatus 100 of Embodiment 1. With respect to the configuration of the photo diode array, as described in Embodiments 1 and 2, it is not limited to the configuration of the differential detection photo diode array.

Figure 8:
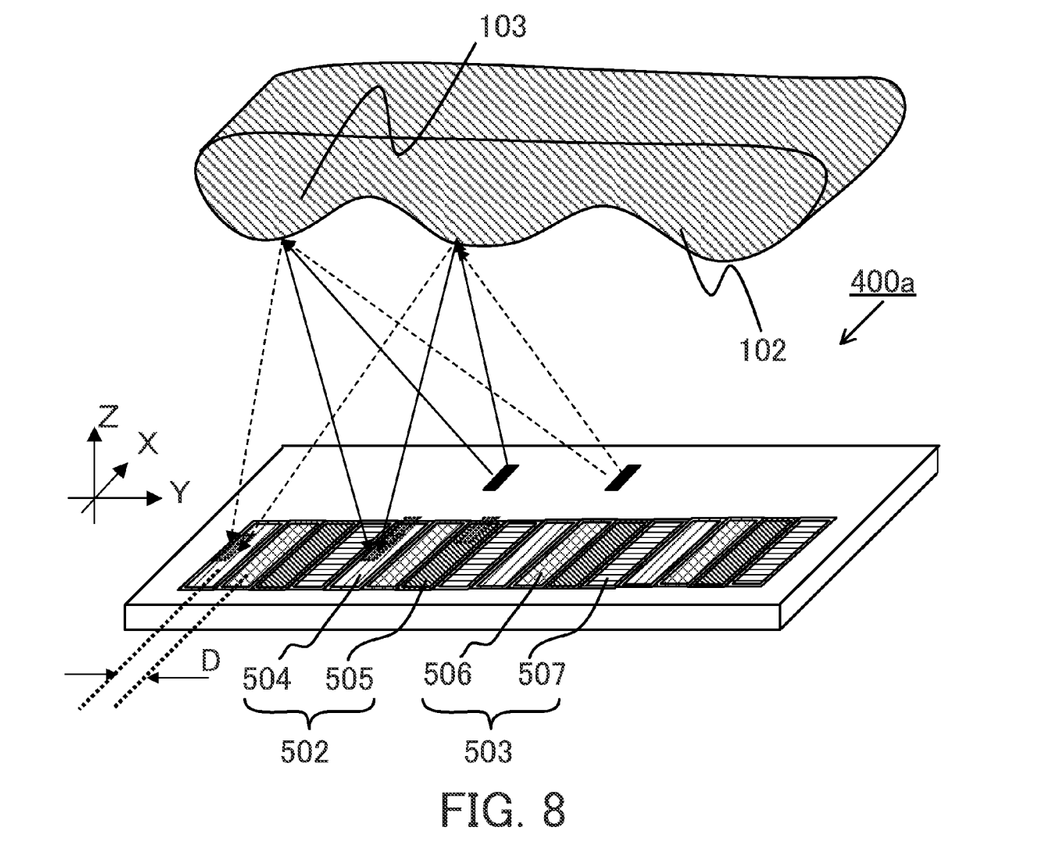
FIG. 8 is a schematic configuration diagram of another velocity measuring apparatus 400a in Embodiment 3.

FIG. 8 is a schematic configuration diagram of another velocity measuring apparatus 400a in the present embodiment. As illustrated in FIG. 8, the velocity measuring apparatus 400a is configured so that the photo diode array groups 502 and 503 are nested. The distance D between the photo diode array groups 502 and 503 is set so as to be shorter than a length of each photo diode array.

Figure 9:
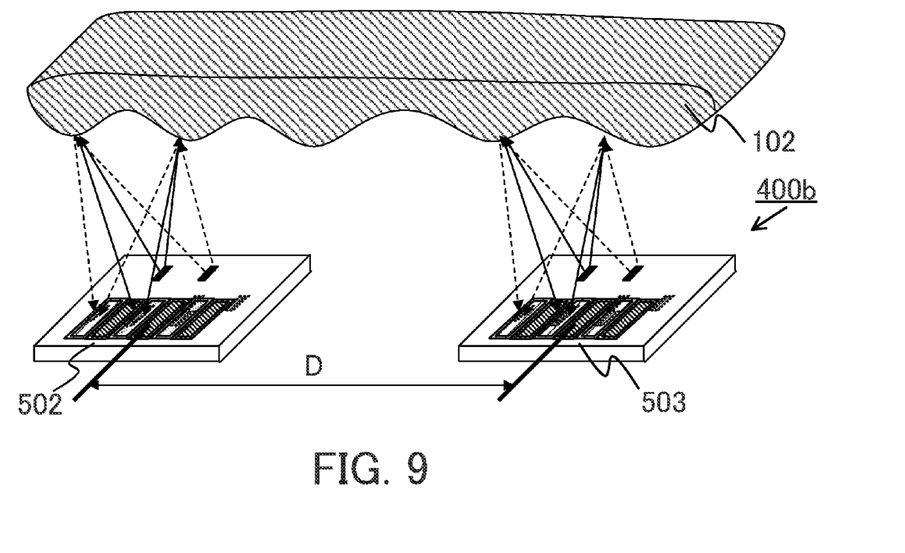
FIG. 9 is a schematic configuration diagram of another velocity measuring apparatus 400b in Embodiment 3.

FIG. 9 is a schematic configuration diagram of another velocity measuring apparatus 400b in the present embodiment. As illustrated in FIG. 9, the photo diode array groups 502 and 503 are not disposed on the same substrate, and the two displacement measuring apparatus described in Embodiments 1 and 2 may also be disposed at a predetermined distance D from each other. In this case, a velocity calculation formula is obtained by V=D/T based on a time T needed for passing a distance D between centers of the photo diode groups in the displacement measuring apparatus.

According to each of the above embodiments, using the light emitting area image that is formed on the light receiving element surface (on the photo diode) by the indentation of the moving object, it is able to obtain a clear optical pattern image. Thus, a displacement detection signal of the moving object which has a good SN ratio as signal integrity is obtained, and as a result, detection accuracy of a displacement amount and a velocity can be improved. Since a detection system does not use an imaging system such as a lens, the size, the weight, and the cost can be reduced. Therefore, a high accurate displacement measuring apparatus can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-012471, filed on Jan. 22, 2010, which is hereby incorporated by reference herein in its entirety.

What is claimed is:

1. A displacement measuring apparatus for measuring a displacement amount of a moving object, the displacement measuring apparatus comprising:
   a light source configured to irradiate the moving object using luminous flux emitted from a light emitting area;
   a light receiving element including a plurality of light receiving areas arranged in a movement direction of the moving object, the light receiving element being arranged such that luminous flux emitted from the light emitting area and reflected from one concave portion, of a plurality of concave portions in the moving object, is converged on a light receiving surface of the light receiving element by reflection from the one concave portion, the luminous flux emitted from the light source being reflected only once by the one concave portion and then entering the light receiving surface; and
   a measurement unit configured to measure the displacement amount of the moving object based on a movement amount of a light emitting area image that is formed on the light receiving element.

2. The displacement measuring apparatus according to claim 1 that meets the following condition:

$0.275 \leq We/Pd \leq 0.87$, where We is a width of the light emitting area in the movement direction of the moving object, and Pd is a pitch between light receiving areas adjacent to each other in the movement direction of the moving object.

3. The displacement measuring apparatus according to claim 1,
   further comprising the moving object;
   wherein the concave portions are discretely or continuously provided on the moving object and have a shape including a radius of curvature which meets the following condition:

$R=(L1+L2)/2$, where R is the radius of curvature of one of the plurality of concave portions, L1 is an optical path length from a light emitting point of the light source to a concave portion of the moving object, and L2 is an optical path length from the indentation of the moving object to the light receiving element.

4. The displacement measuring apparatus according to claim 1,
   wherein the concave portions are arranged in a periodic array so as to meet the following condition;

$PI=Pd/2 \times k$, where PI is an array period of the concave portions, Pd is a pitch between light receiving areas arranged adjacent to each other in the movement direction of the moving object, and k is a positive integer.

5. A velocity measuring apparatus including the displacement measuring apparatus according to claim 1,
   wherein the velocity measuring apparatus is arranged to detect a velocity of the moving object based on the displacement amount of the moving object determined by the displacement measuring apparatus in a predetermined time.

6. The displacement measuring apparatus according to claim 1,
wherein the light source includes an even number of light emitting areas arranged in the movement direction of the moving object, and
wherein the displacement measuring apparatus meets the following condition:

$$\left(1 - \frac{1}{2(N-1)}\right) \times \frac{L1}{L2} < \frac{Pe}{Pd} < \left(1 + \frac{1}{2(N-1)}\right) \times \frac{L1}{L2},$$

where L1 is an optical path length from a light emitting point of the light source to one of the plurality of concave portions of the moving object, L2 is an optical path length from the same concave portion of the moving object to the light receiving element, Pe is a cycle of the light emitting areas in the movement direction of the moving object, and N is the number of light emitting areas and is an integer not less than 2.

7. The displacement measuring apparatus according to claim 1,
wherein the concave portions are provided such that the light emitting area image is formed on the light receiving element by reflecting the luminous flux emitted from the light emitting area on the concave portions.

8. The displacement measuring apparatus according to claim 1,
wherein the concave portions are provided such that the light emitting area image is formed on the light receiving element at same magnification by reflecting the luminous flux emitted from the light emitting area on the concave portions.

9. The displacement measuring apparatus according to claim 1,
wherein the light source is configured to directly irradiate the moving object using the luminous flux emitted from the light emitting area, and
wherein the light receiving element is arranged such that the luminous flux from the light emitting area and reflected from the one concave portion is directly converged on the light receiving surface of the light receiving element.

10. The displacement measuring apparatus according to claim 1,
wherein the one concave portion has a curved shape.

11. The displacement measuring apparatus according to claim 1,
wherein the luminous flux emitted from the light source is reflected only once by the one concave portion so that the light source is imaged on the light receiving surface.

12. The displacement measuring apparatus according to claim 1,
wherein the luminous flux emitted from the light source is reflected only once by the one concave portion so that the luminous flux is imaged on the light receiving surface.

13. A displacement measuring apparatus for measuring a displacement amount of a moving object, the displacement measuring apparatus comprising:
a light source including a light emitting area that emits luminous flux;
a light receiving element configured to receive luminous flux emitted from the light source and reflected from one concave portion, of a plurality of concave portions, formed closer to the light source in the moving object, the luminous flux being converged on a light receiving surface of the light receiving element by reflection from the one concave portion, the luminous flux emitted from the light source being reflected only once by the one concave portion and then entering the light receiving surface;
a measurement unit configured to measure the displacement amount of the moving object based on a movement amount of a light emitting area image that is formed on the light receiving element.

14. The displacement measuring apparatus according to claim 13,
wherein the concave portions are in a periodic array so as to meet the following condition:

$$PI = Pd/2 \times k,$$

where PI is an array period of the concaves, Pd is a pitch between light receiving areas arranged adjacent to each other in the movement direction of the moving object, and k is a positive integer.

15. The displacement measuring apparatus according to claim 13,
wherein the concave portions are provided such that the light emitting area image is formed on the light receiving element by reflecting the luminous flux emitted from the light emitting area on the concave portions.

16. The displacement measuring apparatus according to claim 13,
wherein the concave portions are provided such that the light emitting area image is formed on the light receiving element at same magnification by reflecting the luminous flux emitted from the light emitting area on the concave portions.

17. The displacement measuring apparatus according to claim 13,
wherein the light receiving element is configured to directly receive the luminous flux emitted from the light source and reflected from the one concave portion.

* * * * *